(12) United States Patent
Lee

(10) Patent No.: US 8,964,011 B2
(45) Date of Patent: Feb. 24, 2015

(54) DEVICE AND METHOD FOR DISPLAYING VIDEO

(71) Applicant: Samsung Electronics Co., Ltd., Suwon-si (KR)

(72) Inventor: Seung-jun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/670,647

(22) Filed: Nov. 7, 2012

(65) Prior Publication Data

US 2013/0169769 A1 Jul. 4, 2013

(30) Foreign Application Priority Data

Dec. 30, 2011 (KR) .................. 10-2011-0147555
Jul. 31, 2012 (KR) .................. 10-2012-0084050

(51) Int. Cl.
| | | |
|---|---|---|
| *H04N 13/04* | (2006.01) | |
| *H04N 5/46* | (2006.01) | |
| *H04N 21/44* | (2011.01) | |
| *H04N 21/81* | (2011.01) | |
| *H04N 13/00* | (2006.01) | |

(52) U.S. Cl.
CPC ............ *H04N 13/0445* (2013.01); *H04N 5/46* (2013.01); *H04N 21/44008* (2013.01); *H04N 21/816* (2013.01); *H04N 13/0051* (2013.01); *H04N 13/0497* (2013.01); *H04N 13/0062* (2013.01); *H04N 13/0434* (2013.01); *H04N 13/0438* (2013.01); *H04N 2013/0463* (2013.01)
USPC .................. 348/56; 348/51; 348/54

(58) Field of Classification Search
CPC .......... H04N 13/0438; H04N 13/0497; H04N 13/0454; H04N 13/0445; H04N 5/46; H04N 21/44008; H04N 21/816; H04N 13/0051; H04N 13/0062; H04N 13/0434; H04N 2013/0463
USPC ........ 348/51, 54, 56, 730, 500; 382/154, 232; 386/63
See application file for complete search history.

(56) References Cited

U.S. PATENT DOCUMENTS

| | | |
|---|---|---|
| 7,801,875 B2 | 9/2010 | Kim |
| 7,948,561 B2 | 5/2011 | Yun et al. |

(Continued)

FOREIGN PATENT DOCUMENTS

| | | |
|---|---|---|
| CN | 1968365 A | 5/2007 |
| CN | 101014106 A | 8/2007 |

(Continued)

OTHER PUBLICATIONS

Communication (PCT/ISA/210), dated Jan. 29, 2013, issued by the International Patent Office in counterpart International Application No. PCT/KR2012/009988.

(Continued)

*Primary Examiner* — Allen Wong
(74) *Attorney, Agent, or Firm* — Sughrue Mion, PLLC

(57) ABSTRACT

A device for displaying a video includes: a content processor which, if a content is received, determines a type of the content according to additional information of the content; a controller which, if the content is a 3D content, operates in a 3D display mode and, if the content is a multi-view content, operates in a multi-view mode; and a display which performs a 3D display or multi-view display according to an operation mode of the controller.

18 Claims, 7 Drawing Sheets

(56) References Cited

U.S. PATENT DOCUMENTS

| | | |
|---|---|---|
| 2007/0097024 A1 | 5/2007 | Jung et al. |
| 2007/0109450 A1* | 5/2007 | Lee .............................. 348/730 |
| 2007/0189717 A1 | 8/2007 | Yun et al. |
| 2008/0285863 A1* | 11/2008 | Moon et al. ................... 382/232 |
| 2008/0294636 A1 | 11/2008 | Kim |
| 2010/0124402 A1* | 5/2010 | Minobe .......................... 386/63 |
| 2011/0115888 A1 | 5/2011 | Matsumoto et al. |
| 2011/0122126 A1 | 5/2011 | Han et al. |
| 2011/0134226 A1 | 6/2011 | Kim |
| 2011/0157334 A1 | 6/2011 | Kim et al. |
| 2011/0221871 A1* | 9/2011 | Sakaniwa et al. ............... 348/51 |
| 2011/0228056 A1* | 9/2011 | Okumoto ........................ 348/51 |
| 2011/0286093 A1 | 11/2011 | Bittner |
| 2012/0026396 A1* | 2/2012 | Banavara ..................... 348/500 |
| 2012/0127282 A1 | 5/2012 | Hwangbo |

FOREIGN PATENT DOCUMENTS

| | | |
|---|---|---|
| CN | 101743750 A | 6/2010 |
| CN | 102193201 A | 9/2011 |
| EP | 1 806 915 B1 | 7/2013 |
| JP | 2005167415 A | 6/2005 |
| JP | 2008-236155 A | 10/2008 |
| JP | 2008-295028 A | 12/2008 |
| JP | 2011124971 A | 6/2011 |
| KR | 100667823 B1 | 1/2007 |
| KR | 1020110063002 A | 6/2011 |
| WO | 2010/123324 A2 | 10/2010 |

OTHER PUBLICATIONS

Communication (PCT/ISA/237), dated Jan. 29, 2013, issued by the International Patent Office in counterpart International Application No. PCT/KR2012/009988.
Communication, dated Feb. 18, 2013, issued by the Korean Patent Office in counterpart Korean Application No. 10-2012-0084050.
Communication, dated Apr. 16, 2013, issued by the European Patent Office in counterpart European Application No. 12198974.3.
Communication dated Nov. 19, 2013 issued by the Japanese Patent Office in counterpart Japanese Patent Application No. 2012272923.
Communication dated Apr. 30, 2014 issued by the Japanese Patent Office in counterpart Japanese Patent Application No. 2012-272923.
Communication dated Jul. 21, 2014 issued by the State Intellectual Property Office of P.R. China in counterpart Chinese Patent Application No. 201210482792.1.

* cited by examiner

DEVICE AND METHOD FOR DISPLAYING VIDEO

CROSS-REFERENCE TO RELATED APPLICATIONS

This application claims priority from Korean Patent Application No. 10-2011-0147555, filed Dec. 30, 2011, and Korean Patent Application No. 10-2012-0084050 filed Jul. 31, 2012, in the Korean Intellectual Property Office, the disclosure of which are incorporated herein by reference in their entireties.

BACKGROUND

1. Field

Apparatuses and methods consistent with exemplary embodiments relate to displaying a video, and more particularly, to displaying a video by automatically determining and displaying a video according to a preference keyword of a user without an additional input of the user when the user wants to view a video a three-dimensional (3D) mode or a multi-view mode through one video display device or is viewing the video in the multi-view mode.

2. Description of the Related Art

Various types of video media, such as a cable television (TV), a satellite broadcasting, etc., have appeared to accommodate various interests of individuals. The number of TV broadcasting stations has gradually increased, and the TV broadcasting stations have respectively executed special broadcasting systems which transmit only specific domain broadcasts. This tendency has been developed into a broadcasting form in which members of a family may respectively view their desired broadcasts.

A related art method divides a screen and displays a plurality of broadcasts for simultaneous viewing of the plurality of broadcasts. For example, a Picture-in-Picture (PIP) method is a method of displaying one or more sub-screens on one main screen of a monitor.

However, in the related art PIP method, the members of a family respectively view videos on the screens having different sizes. The members who view the videos on the sub-screens may be inconvenienced and hindered from viewing due to a video of a main screen.

Further, a related art method of using independent monitors as double monitors has been modified into the double screen method to view two screens through one monitor. In a double screen method, two video signals are displayed on one monitor, by equally dividing the monitor main screen into two equal screens, in up and down direction or left and right direction.

Therefore, according to the double screen method, the members of the family respectively view videos on the screens having the same sizes. However, a size of a video display device needs to be increased to accommodate two screens of sufficient equal size, and thus, an aspect of an installation of larger devices in small spaces may be a problem for some users. Further, although the viewing screen spaces are separated from one another, the different videos are displayed on the same screen, and, thus, it may be difficult for the users to concentrate on viewing their desired videos.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a device and a method for display a video, by which users, i.e., members of a family, can view different types of videos through one video display device, and the video display device automatically determines and processes the videos when the users are viewing the videos in a 3D or multi-view mode.

One or more exemplary embodiments also provide a device and a method for display a video, by which a video display device automatically determines and processes a video according to a preference keyword set by a user when the user is viewing the video in a multi-view mode.

According to an aspect of an exemplary embodiment, there is provided a device for displaying a video. The device may include: a content processor which, if a content is received, determines a type of the content according to additional information of the content; a controller which, if the content is a 3D content, operates in a 3D display mode and, if the content is a multi-view content, operates in a multi-view mode; and a display which performs a 3D or multi-vie display according to an operation mode of the controller.

The content processor may include: a plurality of receives which receive contents through different paths; a detector which, if one selected from the plurality of receivers receives the content, processes the received content to detect the additional information; and a determiner which determines whether the content is a 3D content or a multi-view content, by using the detected additional information.

The content processor may include: a high definition multimedia interface (HDMI) unit; a radio frequency (RF) signal receiver which receives an RF signal; an RF signal processor which processes the RF signal received by the RF signal receiver; a scaler which scales video data output from the HDMI unit or the RF signal processor; and a frame processor which forms the scaled video data into a 3D frame or a multi-view frame according to an operation mode of the controller. The content may be received through one of the HDMI unit and the RF signal receiver selected by a user, and at least one of the HDMI unit, the RF signal processor, and the frame processor may detect additional information of the content to determine a type of the content.

The frame processor may form left and right eye videos if the scaled video data is the 3D frame and form videos of different types of contents if the scaled video data is the multi-view frame.

The display alternately may combine and display the left and right eye videos of the content if the controller is in the 3D display mode and alternately combines and displays video frames of a plurality of sub-contents of the content if the controller is in the multi-view mode.

The device may further include: a sync signal generator which generates a sync signal and transmits the sync signal to eyeglasses of the user. The controller may control the sync signal generator to generate a sync signal which is to alternately turn on left and right shutter glasses in the 3D display mode and generate a sync signal which is to simultaneously turn on or off the left and right shutter glasses in the multi-view mode.

The additional information of the content may include additional information of an arbitrary object of the content. If a preference keyword of each user is set in an operation of the multi-view mode, the controller may determine whether there is additional information matching with the set preference keyword to perform the operation of the multi-view mode.

According to an aspect of another exemplary embodiment, there is provided a method of displaying a video. The method may include: if a content is received, determining a type of the content according to additional information of the content; controlling to perform an operation in a 3D display mode if the content is a 3D content and perform an operation in a multi-view mode if the content is a multi-view content; and performing a 3D display or a multi-view display according to an operation mode.

The determination of the type of the content may include: receiving a content through different paths; if one of selected from a plurality of receivers receives the content, processing the received content to detect the additional information; and determining whether the content is the 3D content or the multi-view content, by using the detected additional information.

The determination of the type of the content may include: receiving HDMI data from a HDMI unit; receiving an RF signal from the RF signal processor; processing the received RF signal; scaling video data output from the HDMI unit and the RF signal processor; and forming the scaled video data into a 3D frame or a multi-view frame according to an operation mode of a controller. The content may be received through one of the HDMI unit and the RF signal receiver selected by a user, and at least one of the HDMI unit, the RF signal processor, and a frame processor may detect additional information of the content to determine the type of the content.

The formation of the scaled video data into the 3D frame or the multi-view frame may include: if the scaled video data is formed into the 3D frame, forming left and right eye videos; and if the scaled video data is formed into the multi-view frame, forming videos of different types of contents.

The performance of the 3D display or the multi-view display may include: if the controller is in the 3D display mode, alternately combining and displaying left and right eye videos of the content; and if the controller is in the multi-view mode, alternately combining and displaying video frames of a plurality of sub-contents of the content.

The method may further include: generating a sync signal which is to be transmitted to eyeglasses of a user. The controller may control to generate a sync signal which is to alternately turn on left and right shutter glasses in the 3D display mode and generate a sync signal which is to simultaneously turn on or off the left and right shutter glasses in the multi-view mode.

According to an aspect of another exemplary embodiment, there is provided a method of displaying a video. The method may include: storing a preference keyword of a user in a video display device; receiving a content including additional information matching with the preference keyword; and comparing the preference keyword with the additional information to perform a multi-view operation of each user according to the comparison result in order to display the content.

The storage of the preference keyword of the user in the video display device may include: if the video display device performs a multi-view operation by using first and second contents as the content, storing a keyword of an arbitrary object of the first or second content.

The performance of the multi-view operation of each user to display the content may include: if a content corresponding to the preference keyword is displayed, providing a sync signal which is to inform the user that a content of the preference keyword is provided.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
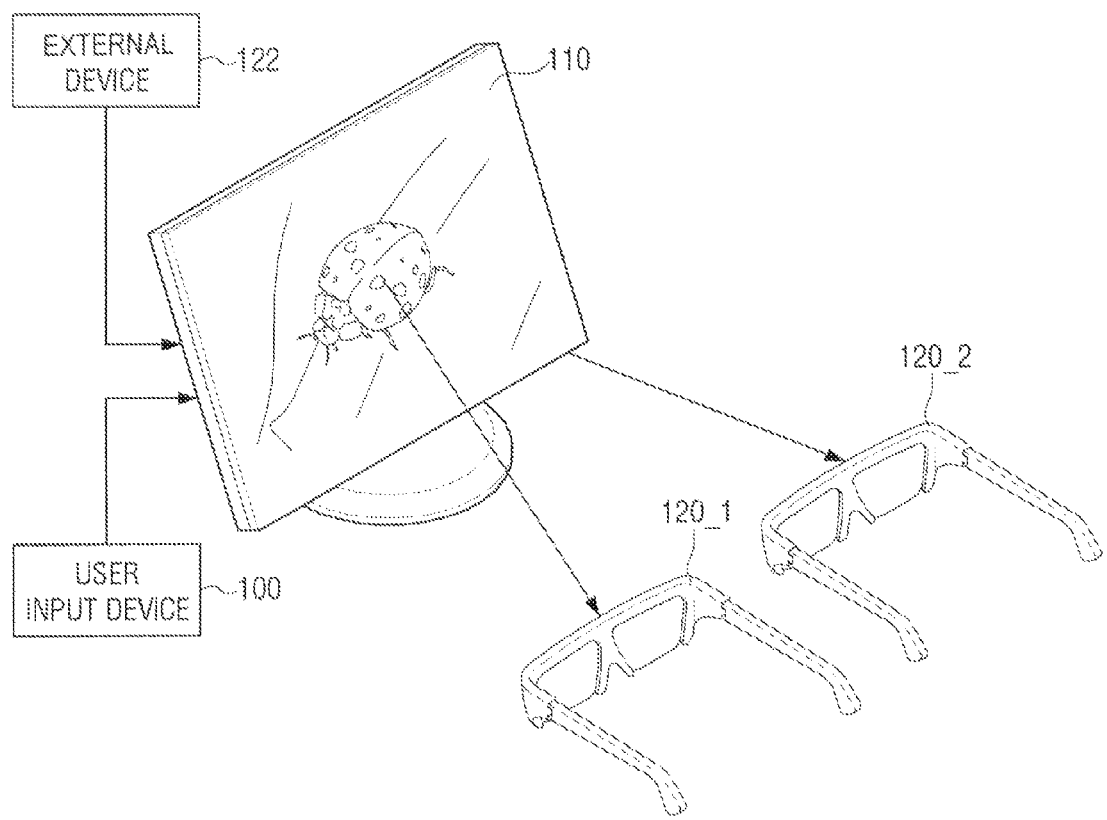
FIG. 1 is a view illustrating a video processing system according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 is a view illustrating a video processing system according to an exemplary embodiment.

Referring to FIG. 1, the video processing system according to the present exemplary embodiment includes a user input device 100, a video display device 110, and some or all of eyeglasses 120_1 and 120_2. The video processing system may further include an external device 122, such as a server or the like, which provides a broadcast video.

The user input device 100 and/or the external device 122 transmit video information to the video display device 110. When transmitting the video information, the user input device 100 may insert additional information into a data packet, such as multi-view information, 3D information, or the like, and then transmit the additional information with the data packet to allow determining whether the video received by the video display device 110 is viewable in a 3D or multi-view mode. The multi-view may include a dual view.

For example, the external device 122, such as a broadcasting station or the like, may insert and transmit the additional information in a process of encoding the input video information. The user input device 100 may be a PC, a game machine, a video cassette recorder (VCR), or the like, which allows checking the additional information through a user interface (UI) screen displayed on a screen of the PC or on a display screen of the video display device 110 when the user input device 100 is connected to the video display device 110. Further, when a particular video is transmitted, the user input device 100 may insert the additional information through a menu selection and transmit the additional information to the video display device 110.

According to an exemplary embodiment, at least one of the external device 122 and the user input device 100 may further include and transmit additional information similar or substantially identical to a preference keyword of one or more users as additional information. For example, when transmitting a content of a baseball game between Samsung and LG constituting one program (or a content), additional information may be transmitted together with the program and, for example, may be include advertising information to advertise Samsung and/or LG. If users set preference keywords in their video display device 110, such additional information may be used to be matched with the preference keywords.

The external device 122, such as the broadcasting station or the like, and the user input device 100 may transmit information, i.e., additional information, to the video display device 110, such as a TV, according to various methods. For example, according to Korean KR3D standards for providing left and right eye videos of a unit frame, 1 bit may be allocated to a reserved area of a stereoscopic program information descriptor and then transmitted, as shown in Table 1 below.

TABLE 1

| Classification | Bit Number |
| --- | --- |
| Stereoscopic_program_info_descriptor( ){ | |
| descriptor_tag | 8 |
| descriptor_length | 8 |
| reserved | 5 |
| stereoscopic_service_type | 3 |

Alternatively, as shown below, a new descriptor may be additionally generated and used.

```
Multiview_Info_descriptor( ){
    descriptor_tag //8bit
    descriptor_length //8bit
    multiview_service_type //8bit
    multiview_name //253byte
}
```

For example, a service type may be classified into the following three service types: type 0 to indicate 3D, type 1 to indicate Dual View, and type 2 to indicate Triple View. However, this is not limiting and fewer or more service types may be used and classified. Also, if keywords matching with the preferred keywords of first, second, and third users are inserted into the name field, the first, second, and third users may automatically view videos according to corresponding service types. For example, the service types may be expressed as shown in Table 2 below.

TABLE 2

| Values | Description |
| --- | --- |
| 000 | Reserved |
| 001 | 2D-only Service |
| 010 | Frame Compatible Stereoscopic Service |
| 011 | Service Compatible Stereoscopic Service |
| 100~111 | Reserved |

When the first user inputs a preferred keyword "Samsung" into the video display device 110 for multi-view viewing, and a broadcasting company inserts and transmits a keyword "Samsung" into "multi-view_name" field, the first user does not need to select a service type according to a multi-view mode, because the keyword "Samsung" in the "multi-view_name" field is matched with the preferred keyword "Samsung" set in the video display device 110.

However, a method of inserting and transmitting additional information matching with a preference keyword of each user as described above may be variously changed. Therefore, an exemplary embodiment is not limited to the Korean KR3D standards.

The user input device 100 or the external device 122 may form and transmit a video format to enable 3D or multi-view viewing. For example, video formatting methods of the 3D and multi-view modes are similar to each other. However, if left and right eye videos of a 3D video are formatted by using a side-by-side method, a top-bottom method, or the like, different types of content videos are formatted instead of the left and right eye videos of the 3D video to enable multi-view viewing. A particular broadcasting company may mix contents of a program broadcasted in a particular time zone and then provide the mixed contents in order to provide dual-view viewing.

According to an exemplary embodiment, the video display device 110 may simultaneously or alternately provide videos of different types of programs (or contents) input from an external source, for example, a nature documentary video as a first video and a drama video as a second video, in a dual view mode. For example, the simultaneously providing the videos indicates that a part of a unit frame is provided as a nature documentary video, and the other part is provided as a drama video. Also, the alternately providing of the videos indicates that, if the video display device 110 is driven at 240 Hz, 120 frames are provided as a nature documentary video and the other 120 frames are provided as a drama video.

The video display device 110 may use a shutter method to realize a multi-view video as described above. For example, the video display device 110 may include a sync signal generator 112 which generates and transmits a sync signal to synchronize with eyeglasses worn by a user. For example, when first and second videos are output, the video display device 110 may transmit sync signals respectively corresponding to the first and second videos to the eyeglasses 120_1 and 120_2 of the users. The eyeglasses 120_1 and 120_2 synchronize with the corresponding sync signals to be repeatedly opened and closed to allow the users to view their desired videos. Left and right eyes of each of the eyeglasses 120_1 and 120_2 may operate according to the same method in a multi-view mode but differently operate in a 3D view mode.

The video display device 110 according to the present exemplary embodiment may use a polarizing method besides the shutter method. Although not shown in the drawings, the video display device 110 may include a polarizing member which is attached to a display panel for this purpose. If the display panel alternately outputs first and second videos, the polarizing member provides the first and second videos according to different types of polarizing methods. For example, if the polarizing member is controlled to horizontally polarize and output the first video, the second video may be vertically polarized and output. Also, the first and second videos may be provided according to different types of polarizing methods such as a left-circular polarization method and a right-circular polarization, or the like.

The polarization method may be variously changed according to an operation of the polarizing member. For example, if the first video and the second video are simultaneously output, a polarizing method may be changed according to each area to output the first and second videos. Also, if the first and second videos are mixed with each other in each odd line and each even line to be displayed, the first and second videos may be output according to different types of polarizing methods in each odd line and each even line.

Also, the video display device 110 according to the present exemplary embodiment may display a video in a multi-view mode when a request is input from a user. However, even when the request is not input from the user, the video display device 110 may automatically change a current mode to a 3D mode or a multi-view mode to display the video. For example, the video display device 110 may insert additional information for displaying a multi-view video or a 3D video into a data packet when the broadcasting station or the user input device 100 transmits video information and then transmit the additional information. Alternatively, if videos are simultaneously input through two paths, the video display device 110 may automatically determine that the videos are multi-view videos and display the input videos on a screen. For example, the video display device 110 displays that a video is to be displayed in a 3D or multi-view mode on a screen to allow acknowledgment by a user. If the broadcasting station analyzes viewing patterns of members of a particular family to format and transmit a video to enable multi-view viewing in a particular time zone as described above, the members of the family need only to wear the corresponding eyeglasses 120_1 and 120_2.

Besides this method, a multi-view or 3D video may be determined according to various methods. For example, a data packet transmitted from the broadcasting station may be decoded to determine a multi-view or 3D video from additional information of the data packet. Also, a characteristic or a video pattern of an input video may be analyzed to obtain corresponding information, for example, by using a known digital signal processing (DSP) method. For example, a multi-view or 3D video information may be transmitted in a side-by-side format or a top-bottom format and thus may be detected to determine the 3D or multi-view video. In the present exemplary embodiment, the determination method is not particularly limited.

If the user sets a preference keyword for multi-view viewing, the video display device 110 may provide a video matching with the preference keyword of the video for multi-view viewing to each user. For example, when information about Samsung and LG is a baseball program, as for example, a video of a batter of Samsung, which is transmitted from the broadcasting station, the video display device 110 may provide only a Samsung-related video to a user who has set "Samsung" as a preference keyword for the multi-view viewing.

In this process, the video display device 110 may compare and/or match additional information of a content transmitted from the broadcasting station, with a preference keyword stored in the video display device 110 and perform a corresponding operation according to the comparison result. If it is determined that the additional information of the content matches with the preference keyword stored in the video display device 110, the video display device 110 may synchronize with a corresponding video to generate and provide a sync signal for driving the eyeglasses 120_1 and 120_2.

According to an exemplary embodiment, the eyeglasses 120_1 and 120_2 may be shutter eyeglasses. If the eyeglasses 120_1 receive the first video, the eyeglasses 120_1 may synchronize with the sync signal provided when the first video is output, to operate. If the eyeglasses 120_2 receive the second video, the eyeglasses 120_2 may synchronize with the sync signal provided when the second video is output from the video display device 110, to operate. Here, if an input video is a 3D video, left and right shutters of the eyeglasses 120_1 and 120_2 are turned on and off at time intervals. The left and right shutters of the eyeglasses 120_1 and 120_2 may operate according to the same method in a multi-view operation. The eyeglasses 120_1 and 120_2 may operate at time intervals.

In multi-view viewing, the eyeglasses 120_1 and 120_2 may synchronize with corresponding videos to operate when videos corresponding to the preference keywords input by the users are provided. For example, if the first and second users perform multi-view viewing, the first and second users may view the same program or a different program. For example, a user, who has set a preference keyword "Samsung," may select and view only a video of a Samsung batter or a Samsung pitcher from an arbitrary content object, e.g., a baseball program between Samsung and LG, through the eyeglasses 120_1 and/or 120_2.

Figure 2:
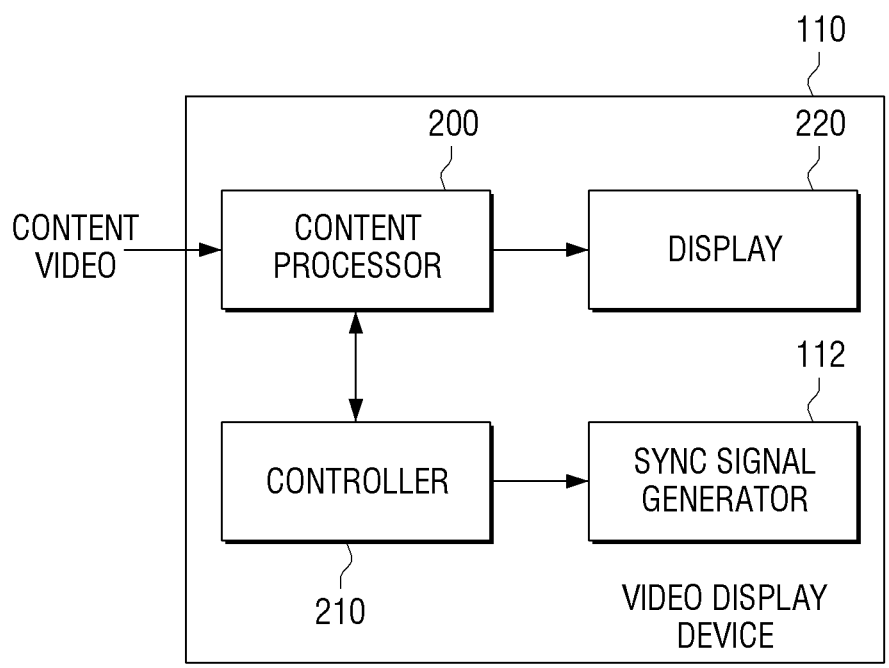
FIG. 2 is a block diagram illustrating a structure of a video display device of FIG. 1.
Figure 3:
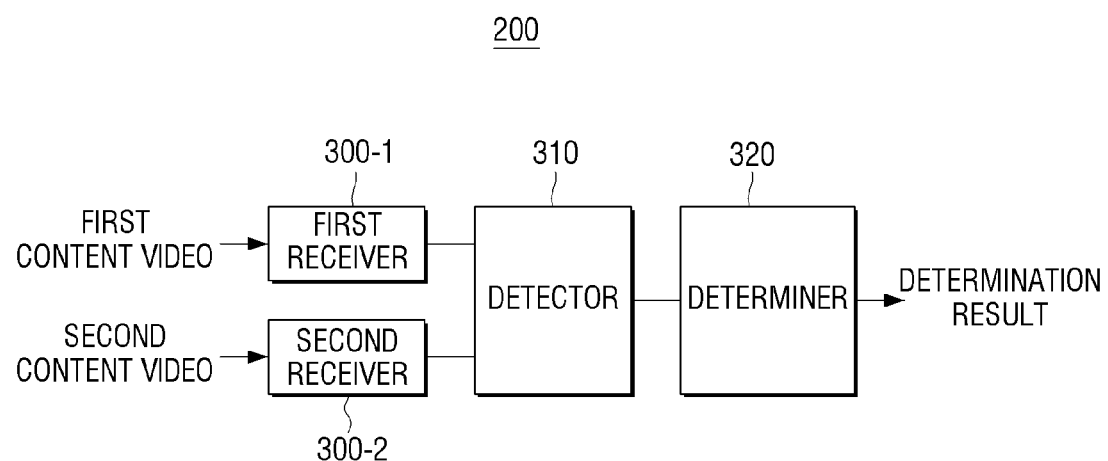
FIG. 3 is a block diagram illustrating a structure of a content processor of FIG. 2.

FIG. 2 is a block diagram illustrating a structure of the video display device 110 of FIG. 1. FIG. 3 is a block diagram illustrating a structure of a content processor 200 of FIG. 2.

Referring to FIGS. 1, 2, and 3, the video display device 110 according to the present exemplary embodiment includes the content processor 200, a controller 210, and a display 220. Here, the content processor 200 and the controller 210 may constitute a driver.

As shown in FIG. 3, the content processor 200 includes first and second receivers 300_1 and 300_2, a detector 310, and a determiner 320. For example, the first receiver 300_1 may receive a broadcast signal through a broadcast channel, and the second receiver 300_2 may receive HDMI information through a user information input path such as a camcorder. The receiving paths of the first and second receivers 300_1 and 300_2 may be set by a request of a user. The detector 310 may detect additional information, to determine a 3D or multi-view video from the broadcast signal or from the HDMI information received through the first and second receivers 300_1 and 300_2, respectively. For example, the detector 310 may check the additional information in an operation of encoding video information of the broadcast signal, check the additional information with reference to packet information of the HDMI information, or detect a correlation or a motion vector from the video signal input through the two paths to check the additional information. The determiner 320 determines whether an input video is a 3D video or a multi-view video, from the additional information provided from the detector 310. If the input video is the multi-view video, the determiner 320 may additionally determine whether the input video matches with a preference keyword input by an arbitrary user and provide the determination result to the controller 210.

The controller 210 controls an overall operation of the video display device 110. For example, the controller 210 may control the display 220 to operate in a 3D mode or a multi-view mode according to a determination result provided from the content processor 200. Also, the controller 210 may operate the video display device 110 to provide a sync signal according to a preference keyword input by a user in order to allow the user to view a video corresponding to a keyword of the user through the eyeglasses 120_1 or 120_2.

The other detailed contents will now be described with reference to FIG. 4.

Figure 4:
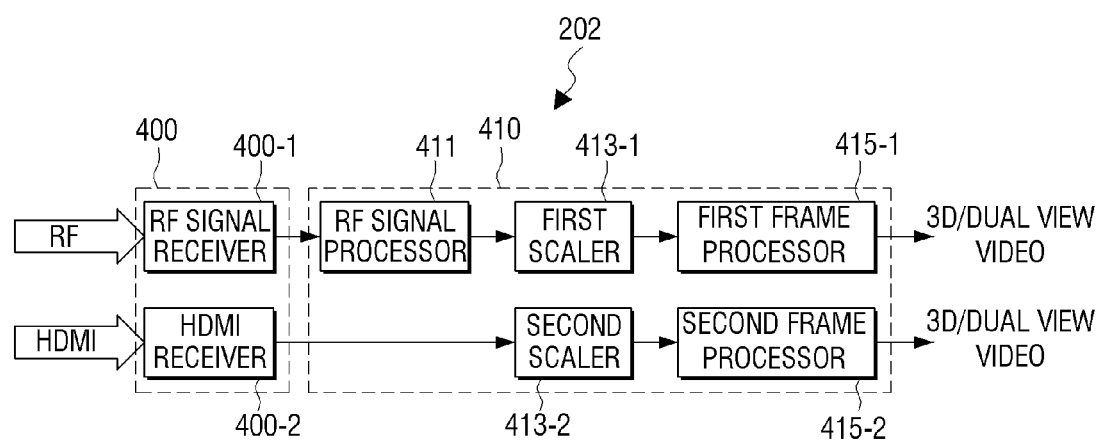
FIG. 4 is a block diagram illustrating another structure of the content processor of FIG. 2.

FIG. 4 is a block diagram illustrating another structure of a content processor 202.

Referring to FIGS. 1, 2, and 4, a content processing device 410 according to the present exemplary embodiment includes an RF signal processor 411, first and second scalers 413_1 and 413_2, and first and second frame processors 415_1 and 415_2.

A receiving device 400 according to an exemplary embodiment includes the RF signal receiver 400_1 and/or the HDMI receiver 400_2. The RF signal receiver 400_1 may include a tuner to receive a broadcast signal, a demultiplexer, an encoder, a synchronizer, an equalizer, etc. For example, the tuner synchronizes and outputs a particular type of signal from the broadcast signal, the demultiplexer separates a voice and a video, and the receiver receives contents according to a selection of the user.

The RF signal processor 411 may be a decoder. The decoder decodes voice and video packets separated by the demultiplexer, more precisely, the video. For example, the video information is encoded and provided from a broadcasting station through the RF signal receiver 400_1, and the decoder decodes the video information.

The first scaler 413_1 may perform a process of converting bit information decoded by the decoder, at an RF path. The second scaler 413_2 may perform an operation of converting bits of data provided from the HDMI receiver 400_2 at an HDMI path. Although the first scaler 413_1 and the second scaler 413_2 are illustrated in FIG. 4, the content processing device 410 may include a single scaler performing the operations of the first scaler 413_1 and the second scaler 413_2.

The first and second frame processors 415_1 and 415_2 form video data scaled according to an operation mode of the controller 210 into a 3D frame or a multi-view frame. For example, the first and second frame processors 415_1 and 415_2 may process left and right eye videos of the 3D frame and store the processed left and right eye videos in a memory or may process videos of different types of contents of the multi-view frame and store the processed videos in the memory. Although the first and second frame processors 415_1 and 415_2 are illustrated in FIG. 4, the content processing device 410 may include a single frame processor performing the operations of the first and second frame processors 415_1 and 415_2.

According to an exemplary embodiment, at least one of the HDMI receiver 400_2, the RF signal processor 411, the first frame processor 415_1, and the second frame processor 415_2 may include a detector which detects additional information and/or a determiner which determines whether a 3D video or a multi-view video is received, from the detected additional information.

The HDMI receiver 400_2 may determine the multi-view video with reference to packet information. The RF signal processor 411 may perform a process of decoding the encoded data packet and thus detect signal index (SI)/video information of the data packet as additional information in order to determine the multi-view video. The first and second frame processors 415_1 and 415_2 may detect a correlation, a motion vector, etc., from an input video signal to determine a multi-view or 3D video.

According to an exemplary embodiment, the first and second frame processors 415_1 and 415_2 may verify whether the multi-view video or 3D video is received when the HDMI receiver 400_2 or the RF signal processor 411 fails to make a determination of the multi-view video or a 3D video. However, the present exemplary embodiment is not particularly limited to double-checking the additional information and/or performing a verification operation.

The controller 210 controls the sync signal generator 112 to generate and transmit a sync signal to alternately turn on left and right shutter glasses in the 3D mode, and generate and transmit a sync signal to simultaneously turn on or off the left and right shutter glasses in the multi-view mode. In addition, if a preference keyword of a user is set, the controller 210 provides a video matching with the corresponding preference keyword, and controls the sync signal generator 112 to generate and transmit a corresponding sync signal.

Also, under control of the controller 210, the display 220 alternately combines and displays left and right eye videos of a content in the 3D mode and alternately combines and displays video frames of a plurality of sub-contents of a content in the multi-vide mode.

According to an exemplary embodiment, even when there is no request of a user, the video display device 110 may automatically determine a multi-view mode or a 3D mode, set the corresponding mode, and display a video. Therefore, the video display device 110 may increase convenience of the user.

Figure 5:
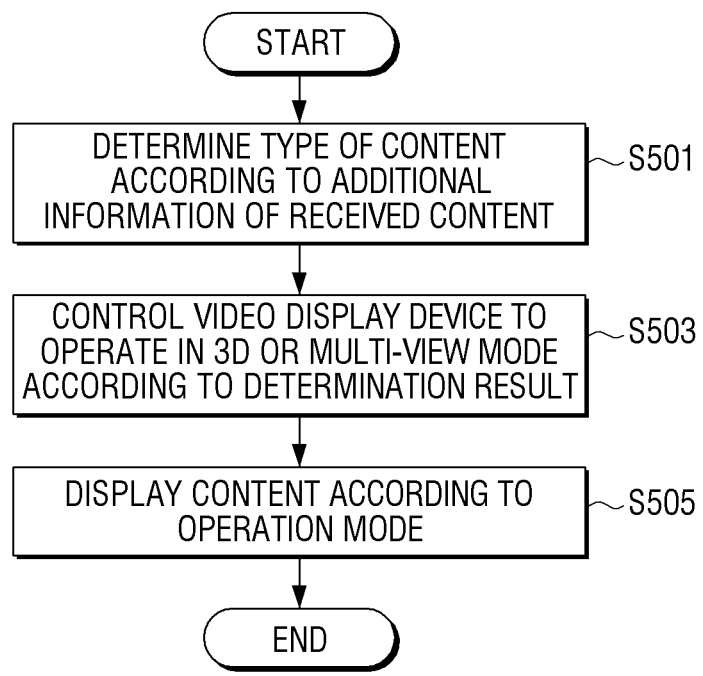
FIG. 5 is a flowchart illustrating a method of displaying a video according to an exemplary embodiment.

FIG. 5 is a flowchart illustrating a method of display a video according to an exemplary embodiment.

Referring to FIG. 5 along with FIGS. 1 and 2 for the descriptive convenience, in operation S501, the video display device 110 according to the present exemplary embodiment determines a type of a content according to additional information of a received content. For example, if the content is received through a broadcast channel according to a request of a user, the video display device 110 may decode data packet of the received content to check additional information in order to determine the type of the content.

In operation S503, the controller 210 of the video display device 110 controls the video display device 110 to operate in a 3D or multi-view mode according to the determination result. Here, the controlling may refer to a process of storing left and right eye videos in a memory and reading the stored videos in the 3D mode or may refer to a process of storing different types of contents in the memory and reading the stored contents in the multi-view mode.

In operation S505, the video display device 110 displays the content on the display 220 according to an operation mode. For example, the video display device 110 alternately outputs unit frames of different types of contents in the multi-view mode. The video display device 110 may transmit a sync signal to the eyeglasses 120_1 and 120_2 when a corresponding video is output.

The other detailed contents will be described with reference to FIG. 6.

Figure 6:
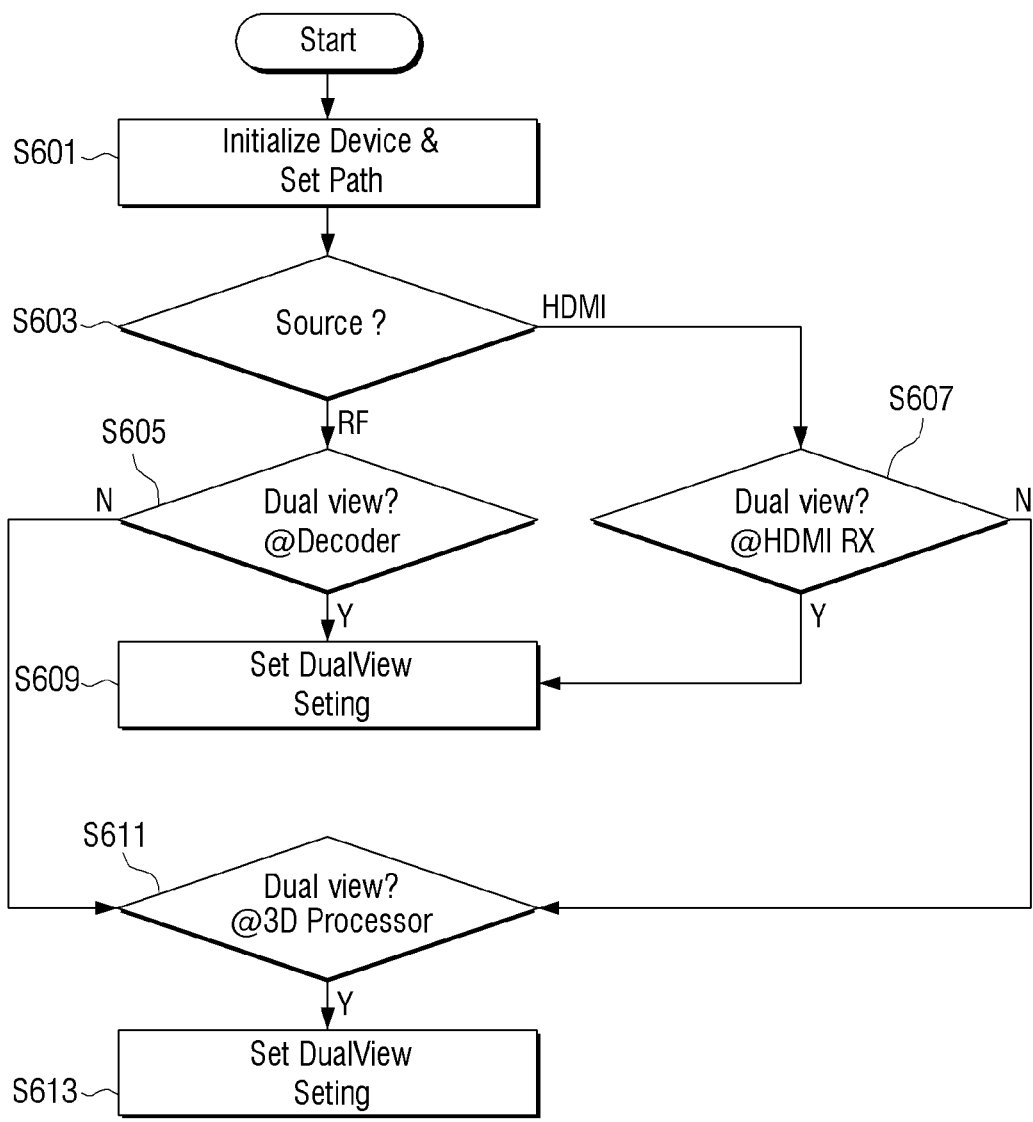
FIG. 6 is a flowchart illustrating a method of displaying a video according to another exemplary embodiment.

FIG. 6 is a flowchart illustrating a method of displaying a video according to another exemplary embodiment.

Referring to FIG. 6 along with FIGS. 1, 2, and 4 for the descriptive convenience, in operation S601, the video display device 110 initializes and sets a path. For example, according to an exemplary embodiment, the video display device 110 may set a first path for receiving an RF signal and a second path for receiving HDMI information. For this purpose, a user may display a UI screen on the display 220 of the video display device 110 and set a first path or a second path through the UI screen.

In operation S603, the video display device 110 determines whether a video received through the set path is an RF signal or HDMI information. For this purpose, the controller 210 of the video display device 110 may check whether the RF signal receiver 400_1 and the HDMI receiver 400_2 of FIG. 4 receive signals.

If it is determined that the RF signal has been received, the video display device 110 may detect and check additional information, for example, by decoding received data packet, in operation S605. The video display device 110 determines whether the received video data is the multi-view data from the corresponding additional information. For example, the received video data may be the dual view data.

If it is determined, in operation S603, that information is received through a HDMI path, the video display device 110 determines whether the information is dual view or 3D information, with reference to received HDMI packet information, in operation S607.

If it is determined, in operations S605 and S607, that the information is the dual view information, the video display device 110 displays videos of different types of received contents in a dual view mode, in operation S609. For example, if it is determined that the information is the dual view information, a first video is transmitted to a first user as the same video to left and right eyes, and a second video is transmitted to a second user as the same video to left and right eyes.

If it is determined, in operations S605 and S607, that the information is not the dual view information, the video display device 110 detects a correlation, a motion vector, etc., in a process of forming a 3D or dual view video to perform the additional determination or verification whether the information is a dual view video or a 3D video, in operation S611.

If it is determined, in operation S611, that the information is the dual view video, the video display device 110 displays the dual view video according to the same method as that of operation S609, in operation S613. If it is determined that the information is the 3D video, the video display device 110 transmits left and right eye videos of the first video to the left and right eyes of the first user at different times and left and right eye videos of the second video to the left and right eyes of the second user at different times.

According to the method of the present exemplary embodiment, although there is no request of a user, a multi-view or 3D video may be automatically determined, a corresponding mode may be set, and a video may be displayed. Therefore, convenience of the user may be increased.

Figure 7:
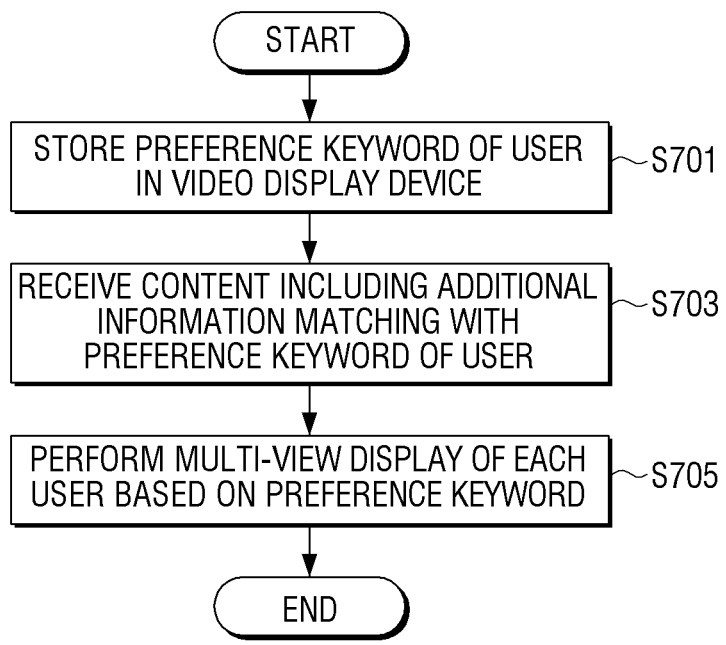
FIG. 7 is a flowchart illustrating a method of displaying a video according to another exemplary embodiment.

FIG. 7 is a flowchart illustrating a method of displaying a video according to another exemplary embodiment.

Referring to FIG. 7 along with FIGS. 1, 2, and 4 for the descriptive convenience, in operation S701, the video display device 110 stores preference keywords of users. The storing the preference keyword of each user may be set for multi-view viewing. Also, the preference keyword may refer to information which is to allow first and second users to view a particular object of a program, i.e., only a Samsung-related video, such as, for example, a video of the Samsung batter and/or Samsung pitcher of a baseball program between Samsung and LG, in multi-view viewing.

In operation S703, the video display device 110 receives a content into which additional information matching with a preference keyword of a user is inserted. In this process, an external device 122 of a broadcasting station or the user input device 100 of FIG. 1 may insert additional information matching with a preference keyword into a video, i.e., a content, and then transmit the video.

If it is determined that the preference keyword has been set, for performing a multi-view viewing, the video display device 110 determines whether there is information matching with a preference keyword, from the additional information of the received content, to perform a multi-view operation for each respective user in accordance with the matched preference keyword, in operation S705. For example, when a video matching with the preference keyword is displayed, the video display device 110 generates and transmits a sync signal which is to inform a user that the video matching with the preference keyword is displayed.

As described above, according to exemplary embodiments, a process of displaying a video may be performed by a video display device having a structure as shown in FIG. 1. However, the process may be performed by video display devices having other types of structures and other devices which do not display videos. Therefore, a driving method or displaying method of the video display device is not particularly limited to the video display device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A device for displaying a video, the device comprising:
a content processor configured to receive content and automatically determine a type of the received content, according to additional information of the content received with the content;
a controller configured to operate in a three-dimensional (3D) mode in response to the received content determined to be a 3D content, and operate in a multi-view mode in response to the received content determined to be a multi-view content;
a display configured to perform a 3D display in response to the controller operating in the 3D mode and perform a multi-view display in response to the controller operating in the multi-view mode,
wherein the controller is configured to extract a left image and a right image from the received content, control the display to display the extracted left image and the extracted right image alternately, and generate and output synchronization signals for the left image and the right image, when operating in the 3D mode, and
the controller is configured to extract a first image and a second image from the received content, control the display to display the extracted first image and the extracted second image alternately, and generate and output synchronization signals for the first image and the second image, when operating in the multi-view mode.

2. The device of claim 1, wherein the content processor comprises:
a plurality of receivers which receive contents through different respective paths;
a detector which processes the received content to detect the additional information from the content received by one of the receivers; and
a determiner which determines whether the content is the 3D content or the multi-view content, based on the detected additional information.

3. The device of claim 1, wherein the content processor comprises:
a high definition multimedia interface (HDMI) receiver which receives an HDMI video;
a radio frequency (RF) signal receiver which receives an RF signal;
an RF signal processor which processes the RF signal received by the RF signal receiver;
a scaler which scales video data output from the HDMI receiver or the RF signal processor; and
a frame processor which forms the scaled video data into a 3D frame or a multi-view frame according to the 3D mode or the multi-view mode of the controller,
wherein the content is received through one of the HDMI receiver and the RF signal receiver selected by a user, and
at least one of the HDMI receiver, the RF signal processor, and the frame processor detects the additional information of the content and determines the type of the content based on the detected additional information.

4. The device of claim 3, wherein the frame processor forms left and right eye videos if the scaled video data is the 3D frame and forms videos of different types of contents if the scaled video data is the multi-view frame.

5. The device of claim 1, wherein the display alternately combines and displays the left and right eye videos of the content if the controller is in the 3D display mode and alternately combines and displays video frames of a plurality of sub-contents of the content if the controller is in the multi-view mode.

6. The device of claim 1, further comprising:
a sync signal generator which generates a sync signal and transmits the sync signal to eyeglasses of the user,
wherein the controller controls the sync signal generator to generate a sync signal to alternately turn on left and right shutter glasses in the 3D display mode and to generate a sync signal to simultaneously turn on or off the left and right shutter glasses in the multi-view mode.

7. The device of claim 1, wherein the additional information comprises additional information about an arbitrary object of the content,
wherein when a preference keyword of each user is set for an operation in the multi-view mode, the controller determines whether the additional information matches with the set preference keyword to perform the operation of the multi-view mode.

8. The device of claim 1, wherein the additional information received with the content comprises a descriptor, and
the content processor is configured to determine whether the received content is the 3D content or the multi-view content by reading content-identifying values written into the descriptor.

9. A method of displaying a video, the method comprising:
receiving content and automatically determining a type of the received content, according to additional information of the content received with the content;
controlling to perform an operation in a three-dimensional (3D) mode in response to the received content determined to be a 3D content and controlling to perform an operation in a multi-view mode in response to the received content determined to be a multi-view content; and
performing a 3D display in response to the operation being performed in the 3D mode and performing a multi-view display in response to the operation being performed in the multi-view mode,
wherein the controlling comprises:
extracting a left image and a right image from the received content, controlling a display to display the extracted left image and the extracted right image alternately, and generating and outputting synchronization signals for the left image and the right image, when operating in the 3D mode, and
extracting a first image and a second image from the received content, controlling the display to display the extracted first image and the extracted second image alternately, and generating and outputting synchronization signals for the first image and the second image, when operating in the multi-view mode.

10. The method of claim 9, wherein the determining the type of the content comprises:
receiving the content through different paths;
processing the received content to detect the additional information; and
determining whether the content is the 3D content or the multi-view content, based on the detected additional information.

11. The method of claim 9, wherein the determining the type of the content comprises:
receiving one of a high definition multimedia interface (HDMI) data from a HDMI receiver and an RF signal from an RF signal receiver;
processing, by an RF signal processor, the RF signal when the RF signal is received from the RF signal receiver;
scaling video data received from the HDMI receiver or the RF signal processor; and
forming, by a frame processor, the scaled video data into a 3D frame or a multi-view frame according to an operation mode,
wherein the content is received through one of the HDMI receiver and the RF signal receiver selected by a user, and
at least one of the HDMI receiver, the RF signal processor, and the frame processor detects the additional information of the content to determine the type of the content.

12. The method of claim 11, wherein the forming the scaled video data into the 3D frame or the multi-view frame comprises:
if the scaled video data is formed into the 3D frame, forming left and right eye videos; and
if the scaled video data is formed into the multi-view frame, forming videos of different types of contents.

13. The method of claim 9, wherein the performing the 3D display or the multi-view display comprises:
when the operation mode is the 3D display mode, alternately combining and displaying left and right eye videos of the content; and
when the operation mode is the multi-view mode, alternately combining and displaying video frames of a plurality of sub-contents of the content.

14. The method of claim 9, further comprising:
generating a sync signal to be transmitted to eyeglasses of a user,
wherein the generated sync signal alternately turns on left and right shutter glasses in the 3D display mode and simultaneously turns on or off the left and right shutter glasses in the multi-view mode.

15. An apparatus comprising:
a content processor configured to receive a content program and automatically determine whether the content program comprises a three-dimensional (3D) content or a multi-view content, based on additional information inserted into the content program and received with the content program;
a controller configured to operate in a 3D mode in response to the received content program determined to be the 3D content, and operate in a multi-view mode in response to the received content program determined to be the multi-view content; and
a display configured to display the content program as a 3D video or multi-view videos on an undivided display screen, based on a determination,
wherein the controller is configured to extract a left image and a right image from the received content program, control the display to display the extracted left image and the extracted right image alternately, and generate and output synchronization signals for the left image and the right image, when operating in the 3D mode, and
the controller is configured to extract a first image and a second image from the received content program, control the display to display the extracted first image and the extracted second image alternately, and generate and output synchronization signals for the first image and the second image, when operating in the multi-view mode.

16. The apparatus of claim 15, wherein the display displays the multi-view videos, by alternately combining and displaying video frames of sub-contents included into the content program, on the undivided display screen.

17. The apparatus of claim 15, wherein the display comprises user keywords set respectively for displaying a first sub-content and a second sub-content, which are included into the content program, as the multi-view videos, and the content processor extracts content keywords describing the first sub-content and the second sub-content, from the additional information, and matches the extracted content keywords with the user keywords.

18. The apparatus of claim 17, wherein the display displays the first sub-content, on the undivided display screen, according to a first sync signal transmitted to first shutter glasses at a first timing, and displays the second sub-content, on the undivided display screen, according to a second sync signal transmitted to second shutter glasses at a second timing different from the first timing.

\* \* \* \* \*